(12) United States Patent
Gurusamy et al.

(10) Patent No.: US 12,481,288 B2
(45) Date of Patent: Nov. 25, 2025

(54) METHOD AND SYSTEMS FOR FACILITATING TAKEOFF AND LANDING OF AN AIRCRAFT

(71) Applicant: Honeywell International Inc., Charlotte, NC (US)

(72) Inventors: Saravanakumar Gurusamy, Tamil Nadu (IN); Pavan Desai, Tamil Nadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 316 days.

(21) Appl. No.: 17/872,357

(22) Filed: Jul. 25, 2022

(65) Prior Publication Data

US 2023/0393590 A1    Dec. 7, 2023

(30) Foreign Application Priority Data

Jun. 1, 2022    (IN) .............................. 202211031454

(51) Int. Cl.
| G05D 1/00 | (2024.01) |
| B64C 29/00 | (2006.01) |
| B64C 39/02 | (2023.01) |

(52) U.S. Cl.
CPC .......... *G05D 1/102* (2013.01); *B64C 29/0008* (2013.01); *B64C 39/024* (2013.01)

(58) Field of Classification Search
CPC .......... G05D 1/102; G05D 1/248; G05D 1/46; G05D 1/652; G05D 1/654; G05D 2105/24;

(Continued)

(56) References Cited

U.S. PATENT DOCUMENTS

| 6,728,636 B2 | 4/2004 | Kokojima et al. |
| 8,892,357 B2 | 11/2014 | Feyereisen et al. |

(Continued)

FOREIGN PATENT DOCUMENTS

| CN | 106184737 A | 12/2016 |
| CN | 109720553 A | 5/2019 |

(Continued)

OTHER PUBLICATIONS

Extended European Search Report Mailed on Nov. 8, 2023 for EP Application No. 23175280, 10 page(s).

(Continued)

*Primary Examiner* — Anne Marie Antonucci
*Assistant Examiner* — Luis G Del Valle
(74) *Attorney, Agent, or Firm* — ALSTON & BIRD LLP

(57) ABSTRACT

Disclosed are methods and systems for facilitating takeoff and landing of an aircraft. For instance, the method may include obtaining aircraft information and retrieving vertiport information for a desired landing or takeoff location area. The method may further include determining an aircraft path including a vertical path portion and a cruise path portion; determining a dynamic switchover point between the vertical path portion and the cruise path portion along the aircraft path; and transmitting control information including a vertical control portion and a cruise control portion to aircraft propulsion systems. Wherein the aircraft propulsion systems will operate under one of the vertical control portion or the cruise control portion until the aircraft reaches the dynamic switchover point, and wherein the aircraft propulsion systems will operate under the other of the vertical control portion or the cruise control portion after the aircraft reaches the dynamic switchover point.

20 Claims, 6 Drawing Sheets

(58) Field of Classification Search
CPC .......... G05D 2107/13; G05D 2109/24; B64C 29/0008; B64C 39/024
See application file for complete search history.

(56) References Cited

U.S. PATENT DOCUMENTS

| | | | |
|---|---|---|---|
| 9,360,866 | B2 | 6/2016 | Gutierrez-Castaneda et al. |
| 10,054,958 | B2 | 8/2018 | Creasman |
| 10,061,481 | B2 | 8/2018 | Senesac |
| 10,279,904 | B2 | 5/2019 | Chen |
| 10,649,468 | B2 | 5/2020 | Cutler et al. |
| 10,913,528 | B1 | 2/2021 | Moore et al. |
| 10,919,629 | B2 | 2/2021 | Gull et al. |
| 11,077,937 | B1* | 8/2021 | Bruell ............... B64D 37/04 |
| 11,667,398 | B2* | 6/2023 | von Flotow .......... B64U 10/50 244/63 |
| 2014/0071119 | A1 | 3/2014 | Piemonte et al. |
| 2015/0197335 | A1* | 7/2015 | Dekel ................ B64U 30/10 701/5 |
| 2018/0148192 | A1* | 5/2018 | Haskins ............. B64D 25/00 |
| 2019/0033889 | A1 | 1/2019 | Von Flotow et al. |
| 2021/0350716 | A1* | 11/2021 | Gariel ............... G08G 5/0052 |
| 2022/0258645 | A1* | 8/2022 | Bower ............... B60L 53/305 |
| 2023/0015158 | A1* | 1/2023 | Evans ............... B64C 37/02 |
| 2023/0384801 | A1* | 11/2023 | Henck ............... B64D 27/30 |

FOREIGN PATENT DOCUMENTS

| | | |
|---|---|---|
| DE | 10313743 | 3/2003 |
| EP | 2431960 A2 | 9/2011 |
| FR | 2965960 | 10/2011 |
| JP | 4489447 B2 | 8/2005 |
| KR | 10-1653240 | 1/2016 |

OTHER PUBLICATIONS

Kleinbekman, I. C., et al., "eVTOL Arrival Sequencing and Scheduling for On-Demand Urban Air Mobility", IEEE/AIAA 37th Digital Avionics Systems Conference (DASC), IEEE, Sep. 23, 2018, pp. 1-7.

Pradeep, P., et al., "Energy Optimal Speed Profile for Arrival of Tandem Tilt-Wing eVTOL Aircraft with RTA Constraint", 2018 IEEE Csaa Guidance, Navigation and Control Conference (CGNCC), IEEE, Aug. 10, 2018, pp. 1-6.

Schweiger, K., et al., "An exemplary definition of a vertidrome's airside concept of operations", Aerospace Science and Technology, vol. 125, Oct. 4, 2021, XP093094637, pp. 1-11.

Communication about intention to grant a European patent Mailed on Oct. 25, 2024 for EP Application No. 23175280, 6 page(s).

Decision to grant a European patent Mailed on Feb. 6, 2025 for EP Application No. 23175280, 3 page(s).

* cited by examiner

METHOD AND SYSTEMS FOR FACILITATING TAKEOFF AND LANDING OF AN AIRCRAFT

CROSS-REFERENCE TO RELATED APPLICATIONS

This application claims the benefit of priority under 35 U.S.C. § 119 from Indian Patent Application No. 202211031454, filed on Jun. 1, 2022, the contents of which are incorporated by reference in their entirety.

TECHNICAL FIELD

Various embodiments of the present disclosure relate generally to the field of navigation for urban air mobility vehicles and, more particularly, to methods and systems for facilitating takeoff and landing of an aircraft.

BACKGROUND

Urban air mobility (UAM) vehicles are often used to navigate in regions with features such as tall buildings and structures, including some buildings on which the UAM vehicle may land. In order to navigate these airspaces, it is often beneficial to have a vehicle capable of vertical takeoffs and landings. Helicopters are one example of such vehicles, however another class of vehicles known as vertical takeoff and landing (VTOL) also are configured to be able to take off and land vertically. As these vehicles are deployed in urban airspaces, conventional guidance computation and display for lateral and vertical deviations may be insufficient for these vehicles to perform both fixed-wing cruising and vertical takeoffs and landings.

The present disclosure is directed to overcoming one or more of these above-referenced challenges.

SUMMARY OF THE DISCLOSURE

According to certain aspects of the disclosure, systems and methods are disclosed for facilitating takeoff and landing of an aircraft.

For instance, a method of facilitating takeoff and landing of an aircraft may include obtaining aircraft information including a current position and a current altitude of the aircraft and retrieving, from a database, vertiport information for a desired landing or takeoff location area including current environmental information and current traffic information. The method may further include determining, based on the aircraft information and the vertiport information, an aircraft path including a vertical path portion and a cruise path portion; determining, based on the aircraft path, a dynamic switchover point between the vertical path portion and the cruise path portion along the aircraft path; and transmitting control information to one or more aircraft propulsion systems wherein the control information includes a vertical control portion and a cruise control portion. Wherein the one or more aircraft propulsion systems will operate under one of the vertical control portion or the cruise control portion of the control information until the aircraft reaches the dynamic switchover point, and wherein the one or more aircraft propulsion systems will operate under the other of the vertical control portion or the cruise control portion of the control information after the aircraft reaches the dynamic switchover point.

Moreover, a system according to the present disclosure may include a memory storing instructions, and a processor executing the instructions to perform a process for facilitating takeoff and landing of an aircraft. The process may include obtaining aircraft information including a current position and a current altitude of the aircraft and retrieving, from a database, vertiport information for a desired landing or takeoff location area including current environmental information and current traffic information. The process may further include determining, based on the aircraft information and the vertiport information, an aircraft path including a vertical path portion and a cruise path portion; determining, based on the aircraft path, a dynamic switchover point between the vertical path portion and the cruise path portion along the aircraft path; and transmitting control information to one or more aircraft propulsion systems wherein the control information includes a vertical control portion and a cruise control portion. Wherein the one or more aircraft propulsion systems will operate under one of the vertical control portion or the cruise control portion of the control information until the aircraft reaches the dynamic switchover point, and wherein the one or more aircraft propulsion systems will operate under the other of the vertical control portion or the cruise control portion of the control information after the aircraft reaches the dynamic switchover point.

Moreover, according to the present disclosure, a method of facilitating takeoff and landing of an aircraft may include obtaining aircraft information including a current position and a current altitude of the aircraft and retrieving, from a database, vertiport information for a desired landing or takeoff location area including current environmental information and current traffic information. The method may further include determining, based on the aircraft information and the vertiport information, an aircraft path including a vertical path portion and a cruise path portion; determining, based on the aircraft path, a dynamic switchover point between the vertical path portion and the cruise path portion along the aircraft path; updating the dynamic switchover point based on obtaining updated aircraft information and retrieving updated vertiport information; transmitting control information to one or more aircraft propulsion systems wherein the control information includes a vertical control portion, a cruise control portion, and a transition control portion; and displaying, on an aircraft display, the aircraft path and the dynamic switchover point. Wherein the one or more aircraft propulsion systems will operate under one of the vertical control portion or the cruise control portion of the control information until the aircraft reaches the dynamic switchover point, and wherein the one or more aircraft propulsion systems will operate under the other of the vertical control portion or the cruise control portion of the control information after the aircraft reaches the dynamic switchover point; and wherein two or more aircraft propulsion systems remain in operation when the aircraft operates under the transition control portion.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for urban air mobility vehicles and, more particularly, to systems and methods for facilitating takeoff and landing of an aircraft.

The present disclosure is directed to overcoming one or more of the challenges discussed above. UAM vehicles operating in urban airspaces may benefit from an ability to take off and land vertically, in addition to the ability to cruise during fixed-wing flight. Accordingly, aircraft may be fitted with a number of displays and navigation aids to provide the operators with information, for example, the positions and heights of buildings in the airspace. When operating the aircraft, the operators may benefit from a system that has the ability to determine and display vehicle paths, including determining a switchover point between vertical propulsion and fixed-wing cruising.

In general, the present disclosure is directed to systems and methods that are able to address one or more of the above challenges by using aircraft and vertiport information to determine an appropriate path and dynamic switchover point to control one or more propulsion systems of an aircraft. For instance, a system may determine a switchover point that transitions an aircraft between vertical and cruising phases of flight in a manner that avoids obstacles while maintaining efficiency. The systems and/or methods of the present disclosure for facilitating takeoff and landing of an aircraft may have an advantage of automatically determining a dynamic switchover point between vertical and cruise phases of flight based on a number of dynamic factors, thereby allowing the aircraft to be efficiently routed with reduced operator intervention.

Therefore, by determining the dynamic switchover point, operators may be able to provide additional attention to other aspects of aircraft flight, while still navigating an efficient path based on dynamically changing conditions.

While this disclosure describes the systems and methods with reference to aircraft, it should be appreciated that the present systems and methods may be applicable to various other vehicles, including those of drones, spacecraft, or any other manned, unmanned, autonomous, and/or internet-connected vehicles, including vehicles operated with one or more propulsion systems and/or phases of flight.

Figure 1:
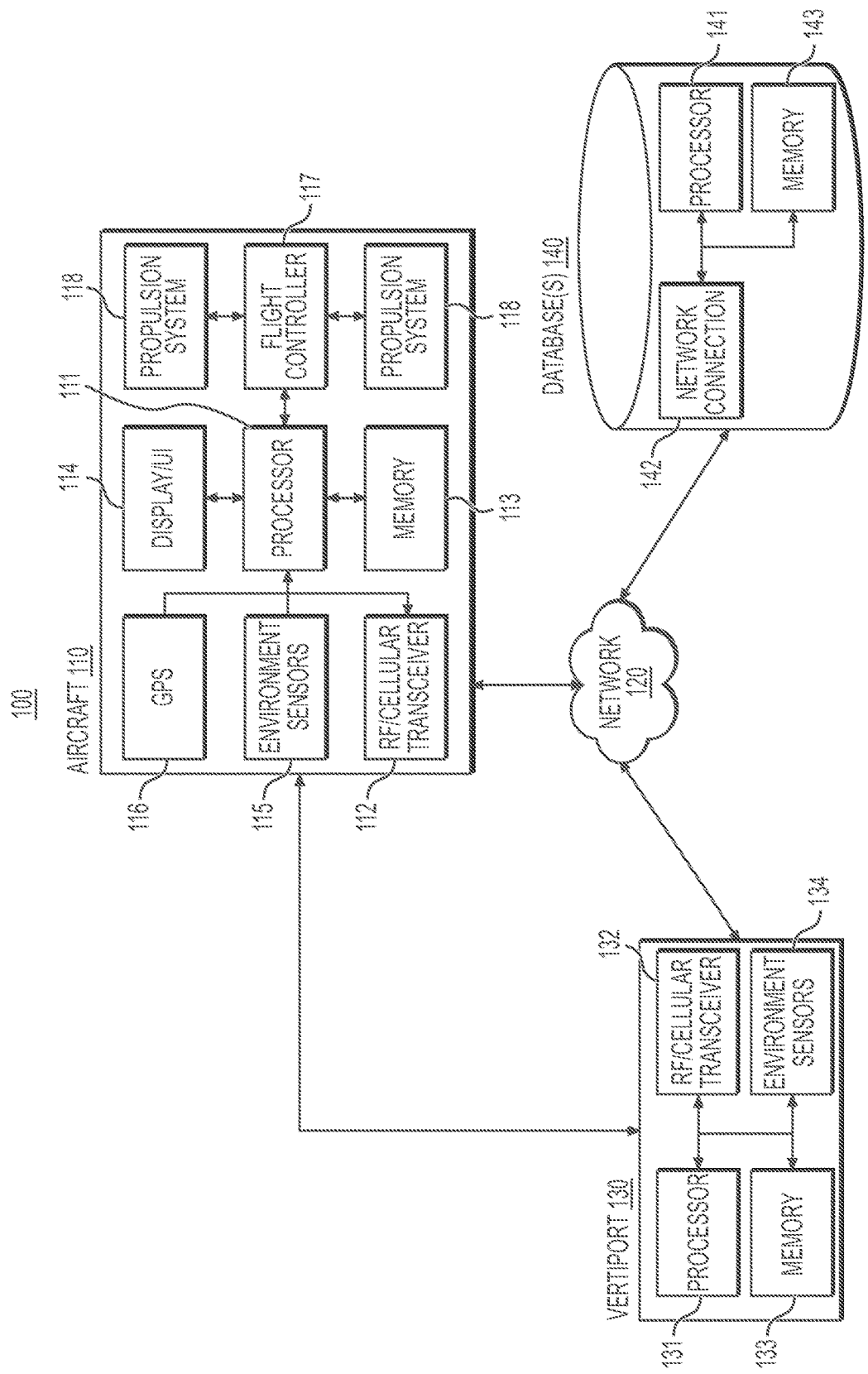
FIG. 1 depicts an exemplary system environment in which methods, systems, and other aspects of the present disclosure may be implemented.

FIG. 1 depicts an example of a system environment 100 in which systems, methods, and other aspects of the present disclosure may be implemented. The system environment 100 of FIG. 1 may include an aircraft 110, a network 120, vertiport 130, and a database 140. Aircraft 110 may include processor 111 in communication with a plurality of other components such as RF/cellular transceiver 112, memory 113, display/user interface (UI) 114, environment sensors 115, GPS 116, flight controller 117, and one or more propulsion systems 118. Processor 111 may include one or more processors that comprise the computing and flight management systems of aircraft 110.

Memory 113 may be one or more components configured to store data related to aircraft 110, including instructions for operating flight components and aircraft systems (e.g., autopilot, route planning, communication). Processor 111 and memory 113 may display information to, and receive inputs from an operator of aircraft 110 via display/UI 114. Display/UI 114 may be of any suitable type, such as one or more monitors, touchscreen panels, heads-up displays, and may include operator input devices such as joysticks, buttons, touch-responsive panels, mice, trackpads, voice recognition devices, and the like. As the aircraft operates, processor 111 may generate one or more graphical user interfaces (GUIs) for display on display/UI 114, to provide relevant and useful information to operators and/or passengers of aircraft 110.

In some embodiments, processor 111 may communicate with environment sensors 115 to, for example, sense obstacles and conditions in and around aircraft 110 as it traverses the airspace, and communicate with GPS 116 in order to, for example, locate aircraft 110 in the airspace. Processor 111 may also be in communication with a flight controller 117 in order to, for example, provide control information to one or more propulsion systems 118. Without deviating from the scope of this disclosure, aircraft 110 may have additional elements that can be in communication with processor 111.

Aircraft 110 may use RF/cellular transceiver 112 to communicate with other elements of the system environment, for example, via network 120 or directly by radio communication. Network 120 may be implemented as, for example, the internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless internet connection in combination with a cellular data network.

Aircraft 110 may take off from, or land at, a vertiport 130. Vertiport 130 may be configured to provide aircraft 110 with information, such as information regarding air traffic, weather conditions, obstacles, and/or other information useful for the flight of aircraft 110. Vertiport 130 may include a processor 131, an RF/cellular transceiver 132, a memory 133, and one or more environment sensors 134. Environment sensors 134 may include, for example, sensors to determine weather conditions, traffic conditions, and/or other information that may be relevant to aircraft as they take-off from, or land at, vertiport 130. Processor 131 and memory 133 may collect and transmit information via RF/cellular transceiver 132, for example, information collected by environment sensors 134. Vertiport 130 may also be in communication with, for example, air traffic control, meteorologists, and/or one or more databases 140.

One or more databases 140 may be repositories for system information such as map data, building data, flight plan data, and the like. Database 140 may include a processor 141, a network connection 142, and a memory 143. Memory 143 may store data, processor 141 may access and organize the stored data to respond to requests and provide updates to the stored data, and information may be provided to other elements in system environment 100 via network connection 142. In some embodiments, database 140 may communicate directly with aircraft 110 via network 120. Further, vertiport 130 may be configured to relay requests for information from aircraft 110 to database 140 via its RF/cellular transceiver 132 or other network connection.

Figure 2:
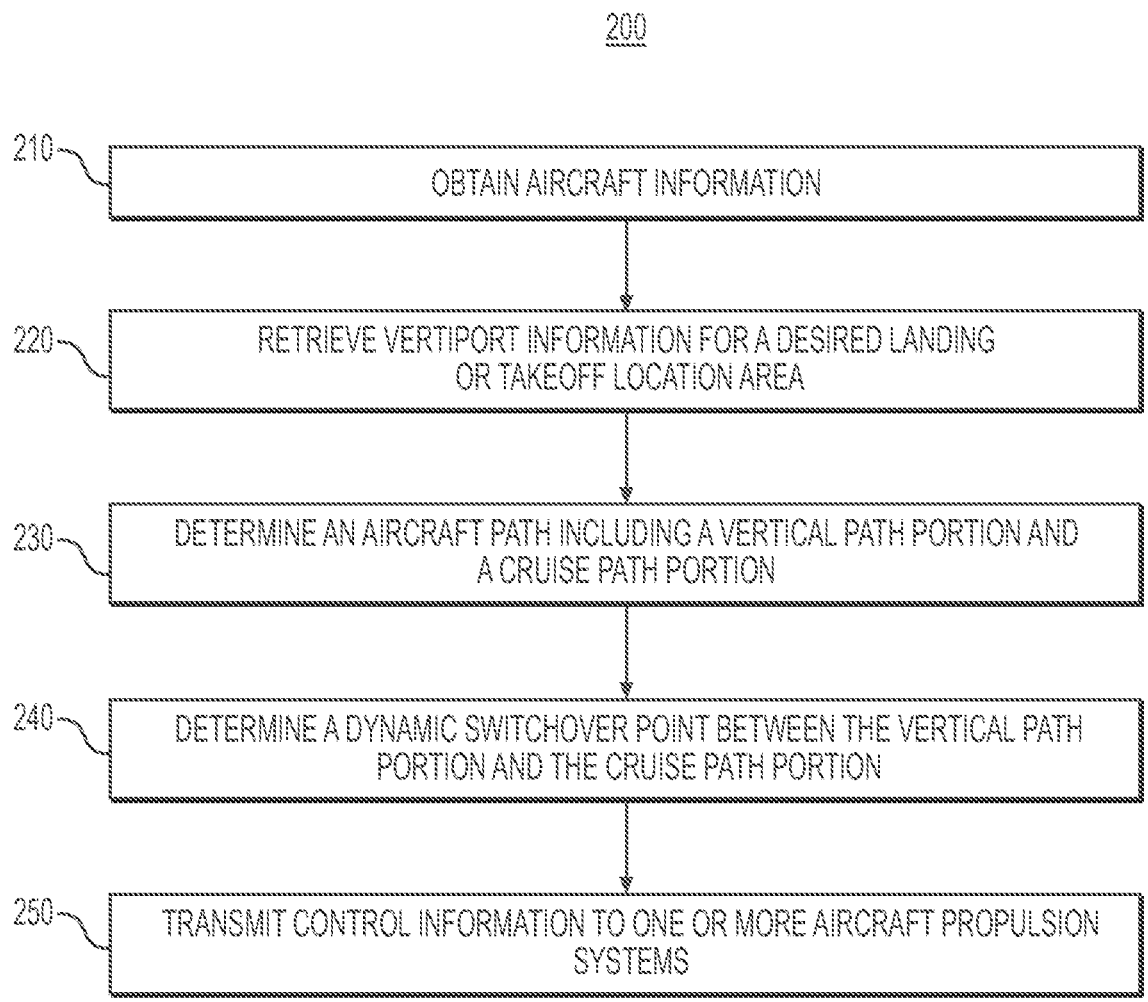
FIG. 2 depicts a flowchart for an exemplary process for facilitating takeoff and landing of an aircraft, according to one or more embodiments.

FIG. 2 illustrates an exemplary method 200 for facilitating takeoff and landing of an aircraft in accordance with embodiments of the present disclosure. It should be understood that the steps described herein, and the sequence in which they are presented, are merely illustrative such that additional and/or fewer steps may be included without departing from the scope of the present disclosure.

Beginning at step 210, processor 111 may obtain aircraft flight information, for example from environment sensors 115 and/or GPS 116. Aircraft flight information may include one or more of a current position, a current altitude, a current trajectory, local terrain elevation, and/or a target destination. The aircraft flight information may also establish parameters for the aircraft flight path, and/or may aid in the determination of conditions of, and/or obstacles in, the airspace.

Having obtained the aircraft flight information, at step 220, the system may then retrieve vertiport information for a desired landing or takeoff location area. This retrieved vertiport information can include, for example, map data, current environmental information, current traffic information, and/or other information that may be relevant to aircraft 110 that is or will be in the vicinity of vertiport 130. The vertiport information may be retrieved from vertiport 130 directly, and/or from one or more databases 140, for example, a vertiport database maintained by an organization such as the FAA. Vertiport information may also be received from other aircraft in the airspace, concurrently and/or at a previous time.

At step 230, processor 111 can determine an aircraft path including a vertical path portion and a cruise path portion. The current position of aircraft 110 and the desired destination can establish the beginning and ending points of the aircraft path. From a top down perspective, the aircraft path may be determinable based on these points, and information regarding obstacles and the like. This aircraft path can generally orient the aircraft in the airspace with respect to the current aircraft position and destination.

Having determined the aircraft path, at step 240, processor 111 may determine a dynamic switchover point between the vertical path portion and the cruise path portion along the aircraft path. In some embodiments, as in a takeoff path, determining the dynamic switchover point between the vertical path portion and the cruise path portion along the aircraft path can include determining a climb-path angle. In embodiments, as in a landing path, determining the dynamic switchover point between the vertical path portion and the cruise path portion along the aircraft path can include determining a glide-path angle.

These climb-path and glide-path angles may be determined based on a number of factors including: the type, weight, power, fuel level, or other characteristics of the aircraft; the positions, heights, and other characteristics of buildings and structures near vertiport 130; one or more guidelines regarding suitable travel angles and clearances required by FAA or other regulations; and other such factors. In takeoff situations where the climb-path angle is determined to be small, the vertical path portion of the aircraft may be extended to provide sufficient clearance of other buildings, while situations that allow a steeper climb-path angle may not require as much vertical travel. Similarly, in landing situations where the glide-path angle is determined to be small, the vertical path portion of the aircraft may be extended to provide sufficient clearance of other buildings, while situations that allow a steeper glide-path angle upon approach to vertiport 130 may not require as much vertical travel.

In addition to the appropriate climb-path/glide-path angles, the proximity of the switchover point to vertiport 130 may be a function of many factors. For example, if the particular aircraft is able to more quickly transition from forward thrust to vertical thrust, the switchover point may be located closer to vertiport 130. While a faster and/or heavier aircraft may need to begin transitioning further away from vertiport 130, indicating a switchover point that may be further from vertiport 130.

Once the aircraft path and dynamic switchover point have been determined, processor 111 may, at step 250, transmit control information to one or more aircraft propulsion system 118. The control information can include, for example, a vertical control portion and a cruise control portion, and processor 111 may transmit the control information directly to one or more aircraft propulsion system 118 or via flight controller 117. For example, one or more aircraft propulsion systems 118 can operate under the vertical control portion or the cruise control portion of the control information until the aircraft reaches the dynamic switchover point, at which point aircraft propulsion systems 118 can operate under the other of the vertical control portion or the cruise control portion of the control information. In some embodiments, the control information can include additional components, such as a transition control portion. Such a transition control portion, may allow two or more aircraft propulsion systems 118 to remain in operation while the aircraft operates under the transition control portion.

In order to inform the operators and/or passengers of the dynamic switchover and flight path, the aircraft path and the dynamic switchover point can be displayed on display/UI 114. Depending on the current position, current altitude, or phase of flight of the aircraft, an appropriate display mode may be selected. For example, and as discussed below with respect to FIGS. 5 and 6, a first person display mode may be employed during the cruise path portion 340, while an external display mode may be employed during the vertical path portion 370.

In order to be responsive to changing conditions such as traffic and weather conditions, aircraft 110 may obtain updated aircraft and vertiport information and update the dynamic switchover point accordingly. The updated aircraft information can include, for example, updates to the current position and the current altitude of the aircraft, and updated vertiport information can include updates to the current environmental information and current traffic information. Further, in some embodiments, portions of the calculated path, such as the vertical path portion, may be transmitted to vertiport 130 and/or database 140 to provide updates to the current traffic information available to other aircraft.

Figure 3:
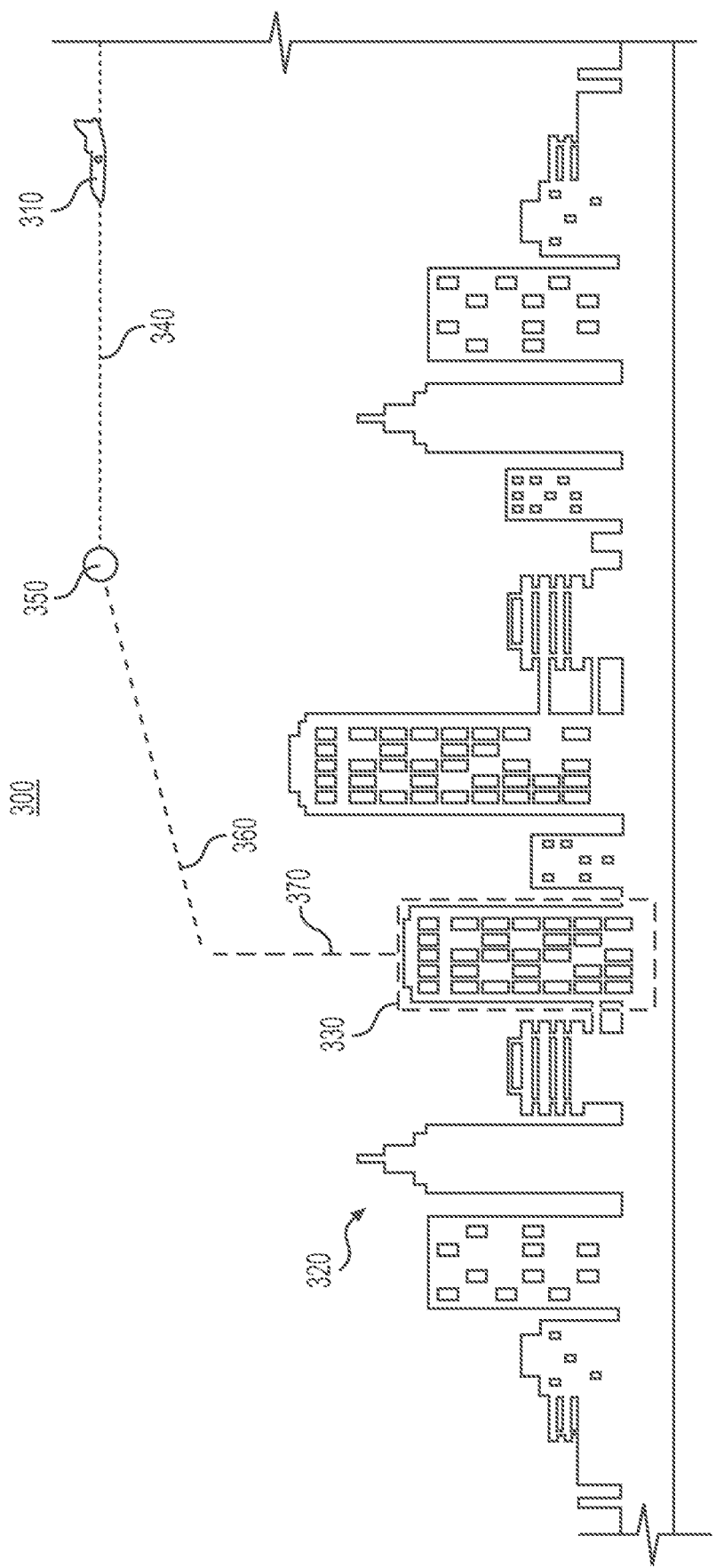
FIG. 3 depicts an exemplary airspace in which methods, systems, and other aspects of the present disclosure may be implemented, according to one or more embodiments.

FIG. 3 depicts an exemplary aircraft landing path in an exemplary airspace 300. As aircraft 310 navigates above buildings and structures 320 in airspace 300, aircraft 310 may proceed along a cruise path 340 approaching the destination vertiport 330. During this portion of the path, aircraft 310 may be operating under the power of a propulsion system 118 configured to provide forward thrust. In order to land at vertiport 330, aircraft 310 may transition, at switchover point 350, to a transition segment 360 of the flight path. During this transition segment 360, one or more propulsion systems 118 of aircraft 310 may transition from the forward thrust provided during the cruise path 340 to a vertical thrust in order to vertically land at vertiport 330. This transition allows aircraft 310 to move from the transition segment 360 of the flight path to the vertical path 370.

Figure 4:
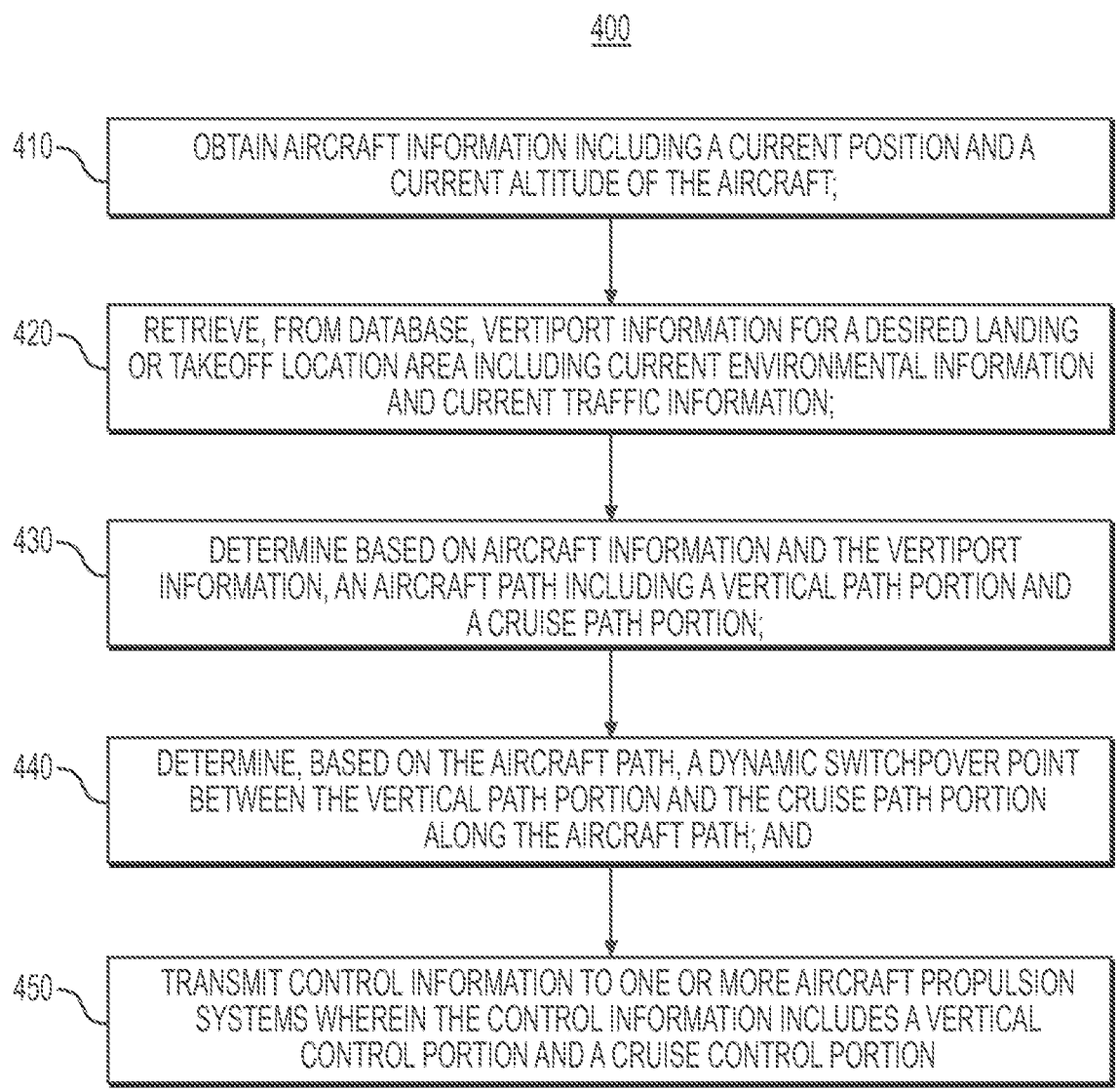
FIG. 4 depicts a flowchart for an exemplary process for facilitating takeoff and landing of an aircraft, according to one or more embodiments.

FIG. 4 illustrates an exemplary method 400 for facilitating takeoff and landing of an aircraft in accordance with embodiments of the present disclosure. Beginning at step 410, processor 111 may obtain aircraft information including a current position and a current altitude of the aircraft. At step 420, the system may then retrieve, from a database, vertiport information for a desired landing or takeoff location area including current environmental information and current traffic information. Based on the aircraft information and vertiport information, at step 430, processor 111 can determine an aircraft path including a vertical path portion and a cruise path portion. Based on the aircraft path, at step 440, processor 111 may determine, a dynamic switchover point between the vertical path portion and the cruise path portion along the aircraft path. Once the aircraft path and dynamic switchover point have been determined, processor 111 may, at step 250, transmit control information to one or more aircraft propulsion systems, wherein the control information includes a vertical control portion and a cruise control portion.

Figure 5:
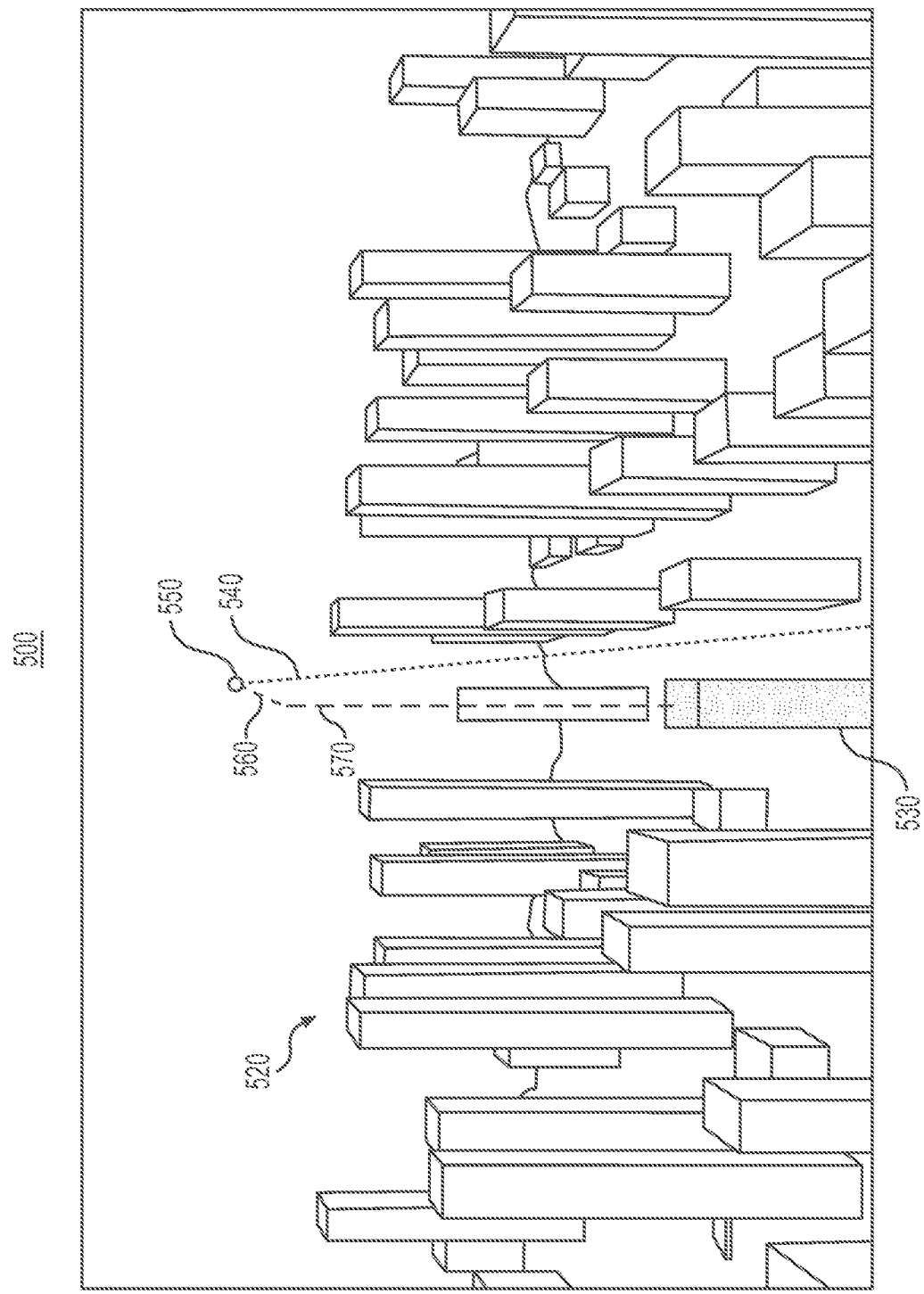
FIG. 5 depicts an exemplary vehicle centric graphical user interface, according to one or more embodiments.

In some embodiments, as illustrated in FIG. 5, display/UI 114 may operate in a first person display mode and display first person display GUI 500. GUI 500 can depict buildings/structures 520, and destination vertiport 530 from the vantage of the aircraft. In some embodiments, processor 111 associated with GUI 500 may generate and display the cruise path 540, the dynamic switchover point 550, transition segment 560, and vertical path 570 in such a way that the operators and/or passengers of the aircraft can view the current aircraft path, including the points at which operation of aircraft propulsion systems 118 may change.

Figure 6:
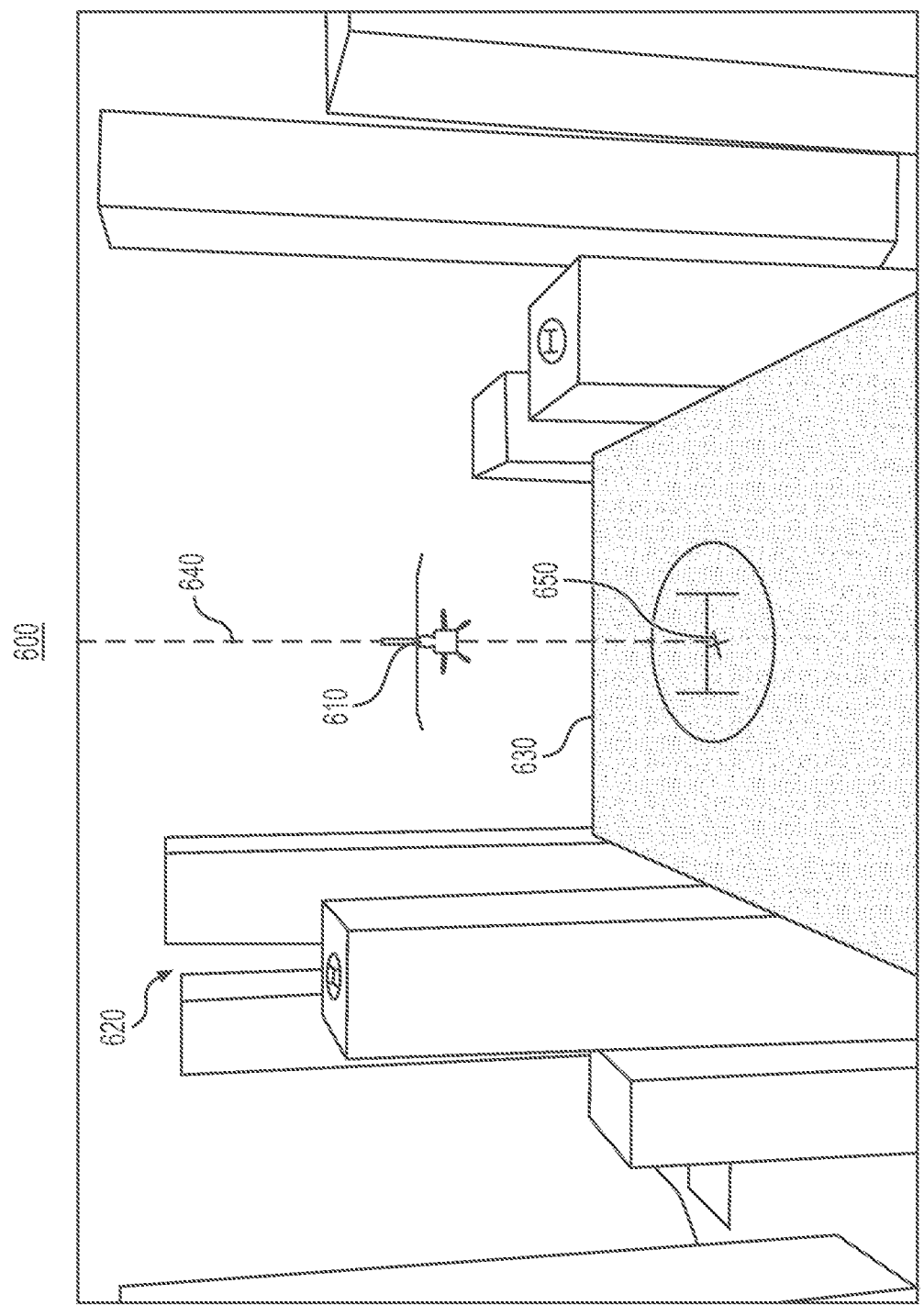
FIG. 6 depicts an exemplary externally oriented graphical user interface, according to one or more embodiments.

As illustrated in FIG. 6, once the aircraft begins the vertical descent to landing or as it takes off, display/UI 114 may operate in an external display mode and display an external display GUI 600, a representation of the aircraft from a third person point of view. GUI 600 may include aircraft 610, buildings/structures 620, the destination vertiport 630, the vertical portion 640 of the aircraft path, and a predicted landing spot 650 as viewed from a position in the vicinity of vertiport 630, but external to the aircraft itself. Such a display may allow the operators and/or passengers of the aircraft to have a better sense of the progress of aircraft 610 along vertical path portion 640, as well as the location of predicted landing spot 650 as predicted by the aircraft, which may be difficult for forward facing operators/passengers.

Systems and methods for facilitating takeoff and landing of an aircraft in accordance with the present disclosure may be able to determine an appropriate path and dynamic switchover point to control one or more propulsion systems of an aircraft and to provide an aircraft operator with an appropriate view of the aircraft as it traverses an airspace. Automatic and dynamic determination of the switchover point for the aircraft may reduce or eliminate the need for an aircraft operator to manually calculate the control inputs needed to transition the aircraft from the cruise portion of the flight path to the vertical portion of the flight path. This in turn may allow the switchover point and transition to be a function of more and more current factors, such as traffic, weather conditions, buildings and structures in the vicinity of the vertiport, and other relevant factors.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of facilitating takeoff and landing of an aircraft having one or more aircraft propulsion systems that are configured to operate in a forward thrust operating mode and a vertical thrust operating mode, the method comprising:

obtaining aircraft information including a current position and a current altitude of the aircraft;

retrieving, from a database, vertiport information for a desired landing location area including current environmental information and current traffic information;

determining, based on the aircraft information and the vertiport information, an aircraft path that includes:

the current position of the aircraft;

a cruise path portion that extends from the current position of the aircraft to a dynamic switchover point;

a transition segment that extends from the dynamic switchover point; and a vertical path portion that extends from the transition segment to the desired landing location area; and transmitting control information to the one or more aircraft propulsion systems, wherein:

the control information includes a vertical control portion, a transition control portion, and a cruise control portion, the one or more aircraft propulsion systems will operate under the cruise control portion of the control information (i) while moving along the cruise path portion, (ii) while operating in the forward thrust operating mode, and (iii) until the aircraft reaches the dynamic switchover point, the one or more aircraft propulsion systems will operate under the transition control portion of the control information (i) after the aircraft reaches the dynamic switchover point, (ii) while moving along the transition segment, and (iii) while transitioning from the forward thrust operating mode to the vertical thrust operating mode, the one or more aircraft propulsion systems will operate under the vertical control portion of the control information (i) while moving along the vertical path portion and (ii) while operating in the vertical thrust operating mode, and the dynamic switchover point and the transition segment is determined based on a speed at which the one or more propulsion systems of the aircraft can transition from the forward thrust operating mode to the vertical thrust operating mode.

2. The method of claim 1, further including updating the dynamic switchover point based on obtaining updated aircraft information and retrieving updated vertiport information.

3. The method of claim 2, wherein the updated aircraft information includes updates to the current position and the current altitude of the aircraft.

4. The method of claim 2, wherein the updated vertiport information includes updates to the current environmental information and the current traffic information.

5. The method of claim 1, wherein the vertical path portion is transmitted to the database to update the current traffic information.

6. The method of claim 1, wherein the transition segment follows a glide path angle that is determined based on a type, a weight, a power, and a fuel level of the aircraft.

7. The method of claim 6, wherein two or more aircraft propulsion systems remain in operation when the aircraft operates under the transition control portion.

8. The method of claim 1, further comprising displaying, on a display of the aircraft, at least a portion of the aircraft path and the dynamic switchover point.

9. The method of claim 8, wherein displaying the at least a portion of the aircraft path and the dynamic switchover point includes:

displaying a first-person point-of-view depiction from a vantage of the aircraft when the aircraft is traveling along the cruise path portion of the aircraft path, wherein the first-person point-of-view depiction includes a depiction of the cruise path portion of the aircraft path; and displaying a representation of the aircraft and the desired landing location area from a third-person point-of-view depiction from a vantage at a position external to the aircraft when the aircraft is traveling along the vertical path portion of the aircraft path, wherein the third-person point-of-view depiction include a depiction of the vertical path portion of the aircraft path.

10. A system comprising:
a memory storing instructions; and
a processor executing the instructions to perform a process for facilitating takeoff and landing of an aircraft having one or more aircraft propulsion systems that are configured to operate in a forward thrust operating mode and a vertical thrust operating mode, the instructions including:
  obtaining aircraft information including a current position and a current altitude of the aircraft;
  retrieving, from a database, vertiport information for a desired landing location area including current environmental information and current traffic information;
  determining, based on the aircraft information and the vertiport information, an aircraft path that includes:
    the current position of the aircraft;
    a cruise path portion that extends from the current position of the aircraft to a dynamic switchover point;
    a transition segment that extends from the dynamic switchover point; and
    a vertical path portion that extends from the transition segment to the desired landing location area; and
  transmitting control information to the one or more aircraft propulsion systems,
  wherein:
    the control information includes a vertical control portion, a transition control portion, and a cruise control portion,
    the one or more aircraft propulsion systems will operate under the cruise control portion of the control information (i) while moving along the cruise path portion, (ii) while operating in the forward thrust operating mode, and (iii) until the aircraft reaches the dynamic switchover point,
    the one or more aircraft propulsion systems will operate under the transition control portion of the control information (i) after the aircraft reaches the dynamic switchover point, (ii) while moving along the transition segment, and (iii) while transitioning from the forward thrust operating mode to the vertical thrust operating mode,
    the one or more aircraft propulsion systems will operate under the vertical control portion of the control information (i) while moving along the vertical path portion and (ii) while operating in the vertical thrust operating mode, and
    the dynamic switchover point and the transition segment is determined based on a speed at which the one or more propulsion systems of the aircraft can transition from the forward thrust operating mode to the vertical thrust operating mode.

11. The system of claim 10, further including updating the dynamic switchover point based on obtaining updated aircraft information and retrieving updated vertiport information.

12. The system of claim 11, wherein the updated aircraft information includes updates to the current position and the current altitude of the aircraft.

13. The system of claim 11, wherein the updated vertiport information includes updates to the current environmental information and the current traffic information.

14. The system of claim 10, wherein the vertical path portion is transmitted to the database to update the current traffic information.

15. The system of claim 10, wherein the transition segment follows a glide path angle that is determined based on a type, a weight, a power, and a fuel level of the aircraft.

16. The system of claim 15, wherein two or more aircraft propulsion systems remain in operation when the aircraft operates under the transition control portion.

17. The system of claim 10, further including an aircraft display, the process further comprising displaying, on the aircraft display, at least a portion of the aircraft path and the dynamic switchover point.

18. The system of claim 17, wherein displaying the at least a portion of the aircraft path and the dynamic switchover point includes:
  displaying a first-person point-of-view depiction from a vantage of the aircraft when the aircraft is traveling along the cruise path portion of the aircraft path, wherein the first-person point-of-view depiction includes a depiction of the cruise path portion of the aircraft path; and
  displaying a representation of the aircraft and the desired landing location area from a third-person point-of-view depiction from a vantage at a position external to the aircraft when the aircraft is traveling along the vertical path portion of the aircraft path, wherein the third-person point-of-view depiction include a depiction of the vertical path portion of the aircraft path.

19. A method of facilitating takeoff and landing of an aircraft having one or more aircraft propulsion systems that are configured to operate in a forward thrust operating mode and a vertical thrust operating mode, the method comprising:
  obtaining aircraft information including a current position and a current altitude of the aircraft;
  retrieving, from a database, vertiport information for a desired landing location area including current environmental information and current traffic information;
  determining, based on the aircraft information and the vertiport information, an aircraft path that includes:
    the current position of the aircraft;
    a cruise path portion that extends from the current position of the aircraft to a dynamic switchover point;
    a transition segment that extends from the dynamic switchover point; and
    a vertical path portion that extends from the transition segment to the desired landing location area;
  updating the dynamic switchover point based on obtaining updated aircraft information and retrieving updated vertiport information;
  transmitting control information to the one or more aircraft propulsion systems, wherein the control information includes a vertical control portion, a transition control portion, and a cruise control portion; and
  displaying, on an aircraft display, the aircraft path and the dynamic switchover point,
  wherein:
    the one or more aircraft propulsion systems will operate under the cruise control portion of the control information (i) while moving along the cruise path portion, (ii) while operating in the forward thrust operating mode, and (iii) until the aircraft reaches the dynamic switchover point,
    the one or more aircraft propulsion systems will operate under the transition control portion of the control information (i) after the aircraft reaches the dynamic switchover point, (ii) while moving along the transition segment, and (iii) while transitioning from the forward thrust operating mode to the vertical thrust operating mode, the one or more aircraft propulsion systems will operate under the vertical control portion of the control information (i) while moving along the vertical path portion and (ii) while operating in the vertical thrust operating mode, the dynamic switchover point and the transition segment is determined based on a speed at which the one or more propulsion systems of the aircraft can transition from the forward thrust operating mode to the vertical thrust operating mode, and two or more aircraft propulsion systems remain in operation when the aircraft operates under the transition control portion.

20. The method of claim 19, wherein the transition segment follows a glide path angle that is determined based on a type, a weight, a power, and a fuel level of the aircraft.

* * * * *